E. A. LOWE.
PIVOT OR KNUCKLE JOINT CONNECTION.
APPLICATION FILED JAN. 8, 1918.
1,363,477. Patented Dec. 28, 1920.
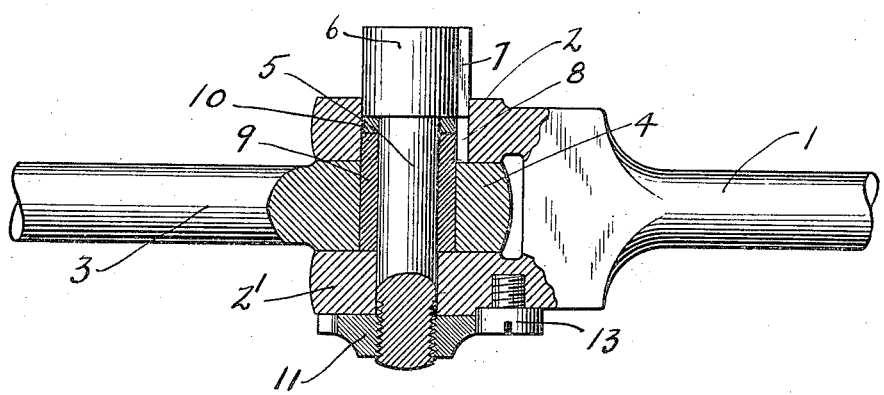
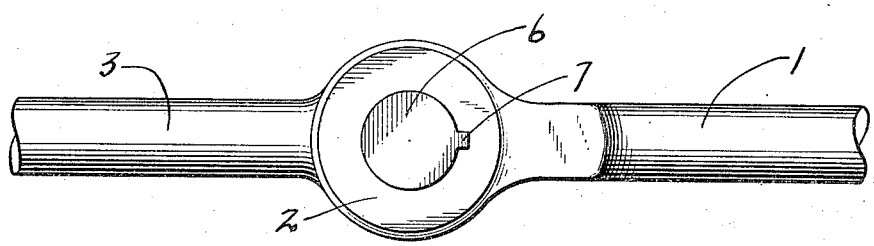
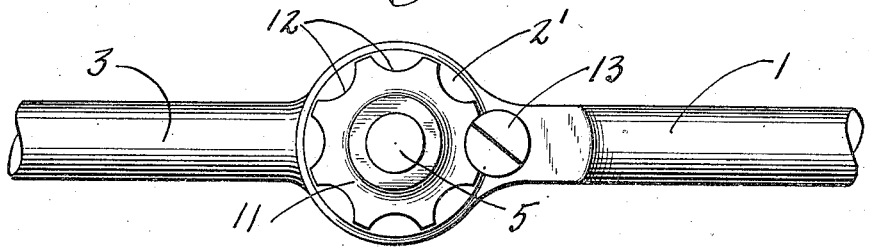
INVENTOR
ERNEST A. LOWE
BY
Townsend & Decker
ATTORNEYS

UNITED STATES PATENT OFFICE.

ERNEST A. LOWE, OF PLAINFIELD, NEW JERSEY.

PIVOT OR KNUCKLE JOINT CONNECTION.

1,363,477.  Specification of Letters Patent.  Patented Dec. 28, 1920.

Application filed January 3, 1918. Serial No. 210,804.

*To all whom it may concern:*

Be it known that I, ERNEST A. LOWE, a citizen of the United States, and a resident of Plainfield, in the county of Union and State of New Jersey, have invented certain new and useful Improvements in Pivot or Knuckle Joint Connections, of which the following is a specification.

My invention relates to joints and more particularly to joints in which the members are hinged or pivoted together and it is particularly adapted in its application to steering-knuckles, thill-couplings and other analogous structures.

My invention has for its object the production of an anti-rattling and shock-absorbing hinged or pivoted joint which shall be of simple construction and which shall also be practically wear-proof.

A further object of my invention is the production of a hinged or pivoted joint having the above characteristics and provided with a compressible and preferably lubricated packing or bushing interposed between one of the pivoted or hinged members and the pin or other part joining the members together so that the joint will be self-lubricating and so that grease cups may be dispensed with.

A further object of the invention is the production of a hinged or pivoted joint of the character above described which shall have means for compressing the lubricated bushing or packing or for permitting the same to expand so that the joint may be tightened or loosened as desired.

To the above ends my invention consists in the improved hinged or pivoted joint hereinafter more particularly described in the specification and then specified in the claims.

In the accompanying drawing in which the invention is shown as embodied in a knuckle joint:

Figure 1 is a plan view (partly in section) of the knuckle joint showing my invention.

Fig. 2 is a side elevation of the same looking from one side.

Fig. 3 is a side elevation of the same looking from the other side.

Referring more particularly to the several figures of the drawing:

1 indicates the forked member of the knuckle joint provided with extensions or ends 2 2′ and 3 indicates the coöperating or joined member having a head 4. The extensions or ends 2 2′ and the head 4 are provided with cylindrical openings adapted to receive a pin or bolt 5 for pivotally joining the members together. The opening in the extension 2 is of such size as to permit it to receive and support the head 6 of the bolt and the opening in the extension 2′ is of a size sufficient only to receive the end of the shank of the bolt. As is illustrated, the diameter of the opening in the head 4 is considerably greater than the diameter of the shank of the pin so as to leave an enlarged space between the pin and head to be filled with a compressible and lubricating material to be hereinafter described. 7 indicates a spline with which the head 6 of the pin is provided and 8 indicates a groove in the extension 2 adapted to receive said spline so that when in normal position a relative rotary movement of the pin with respect to said forked member 1 is impossible.

9 indicates a compressible packing or bushing of any suitable material, which is preferably lubricated, as for instance an asbestos graphited valve packing, and which is interposed in the space between the shank of the pin 5 and the head 4 of the coöperating member 3 and which engages the side of the extension 2′ and also preferably extends to some extent within the opening in the extension 2. An annular rubber washer 10 is carried by the shank of the pin and contacts with the head 6 of the pin and the packing or bushing 9.

11 indicates a nut engaging the threaded end of the pin 5 and which is provided with depressions 12, as indicated, adapted to coöperate with the head of a screw 13 carried by the extension 2′. As is obvious unless the screw 13 is first removed, the nut 11 may not be turned and when the screw is replaced the nut is locked in the desired position it then occupies. A tightening of the nut acts to draw the pin longitudinally through the joint, as is manifest, the engagement of the spline 7 with the groove 8 preventing the pin from rotating during the operation of the nut. When the nut 11 is tightened the head 6 of the pin is forced against the washer 10 which in turn compresses the bushing or packing 9 so as to tighten the joint between the members. Conversely, when the nut 11 is loosened the bushing or packing 9 is allowed to expand thereby loosening the joint between the members. The joint, however, is at all times prevented from wabbling due to the fact that the end of the shank of the pin or bolt 5 and head 6 closely interfit with the openings in the extensions 2′ and 2 respectively.

My improved joint is particularly desirable for the reason that it may be easily and expeditiously adjusted, that is, it may be tightened or loosened to meet varying conditions. Also the use of the compressible bushing or packing 9 in the manner indicated makes the joint practically wear-proof due to the absence of friction and contact between what would ordinarily be the wearing parts of the conventional form of knuckle joint and it also makes the joint anti-rattling, shock-absorbing and self-lubricating as is apparent. A further advantage of the invention is that the compressible packing or bushing may easily be removed and new packing substituted at small cost whenever it is so desired.

What I claim as my invention is:

1. In a joint, a forked member with extensions each having an opening therein, a coöperating member having an enlarged opening therein, a pin provided with a head fitting within the opening of one of said extensions and a shank extending through the enlarged opening in the coöperating member and fitting within the opening of the other extension and a compressible lubricating packing encircling the shank of said pin and filling the space intermediate the shank and the coöperating member and engaging the side of one of said extensions, said packing being adapted to be compressed by the head of said pin.

2. In a joint, a forked member with extensions each having an opening therein, a coöperating member having an enlarged cylindrical opening therein, a pin provided with a head received by and fitting within the opening of one of said extensions and a shank extending through the enlarged opening in the coöperating member and fitting within the opening of the other extension, a compressible lubricating packing encircling the shank of said pin and filling the space intermediate the shank and the coöperating member and engaging the side of one of said extensions and projecting into the opening of the other extension which receives the head of said pin, a nut on the screw-threaded pin adapted, by a turning thereof, to draw the head of the pin into the opening which receives it to compress the packing, means for preventing rotation of said pin when the nut is operated and means carried by one of said extensions and adapted to engage said nut to lock the same against movement.

Signed at New York in the county of New York and State of New York this 7th day of January A. D. 1918.

ERNEST A. LOWE.

Witnesses:
F. B. TOWNSEND,
F. C. SIEBOLD.